April 5, 1938.  A. H. DE ROCHER  2,113,556
DISK PLOW
Filed March 14, 1936  2 Sheets-Sheet 1
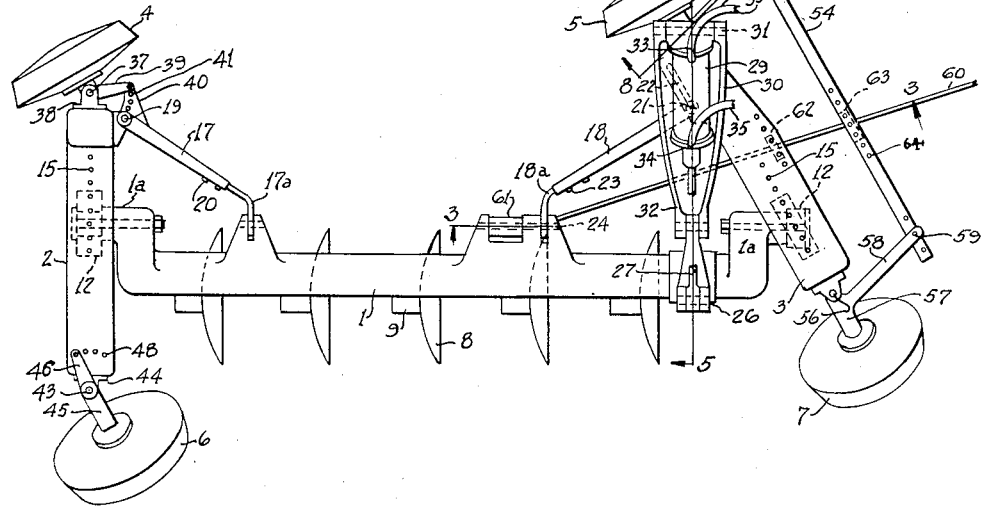
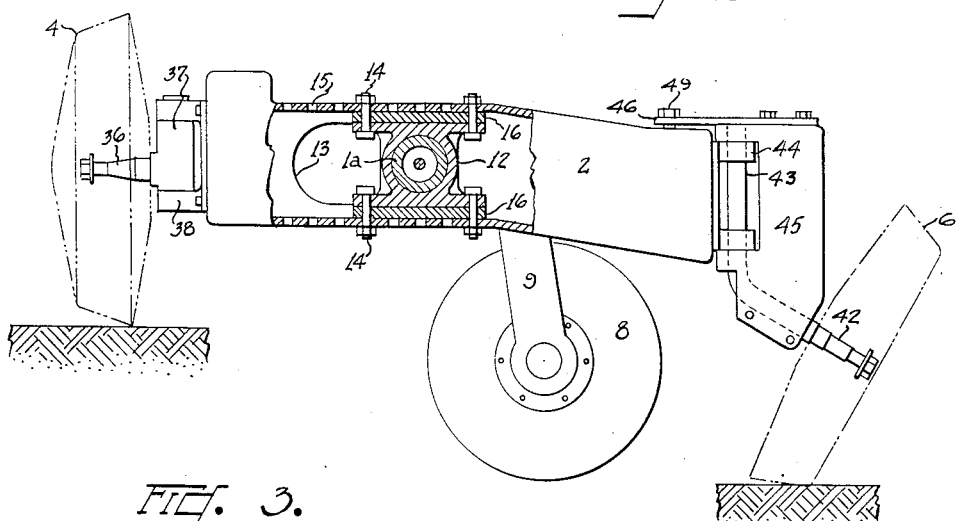
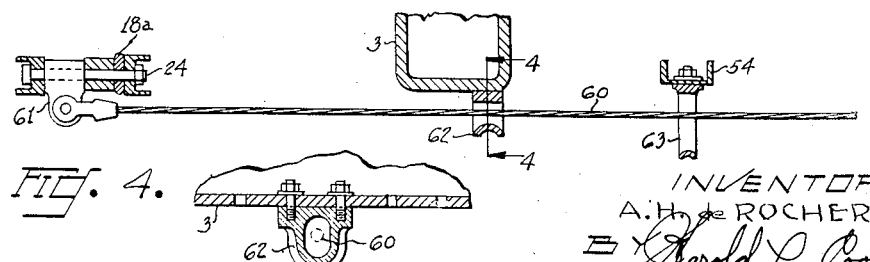
INVENTOR
A. H. de ROCHER
BY Harold L. Cook
ATTORNEY April 5, 1938.  A. H. DE ROCHER  2,113,556
DISK PLOW
Filed March 14, 1936  2 Sheets-Sheet 2
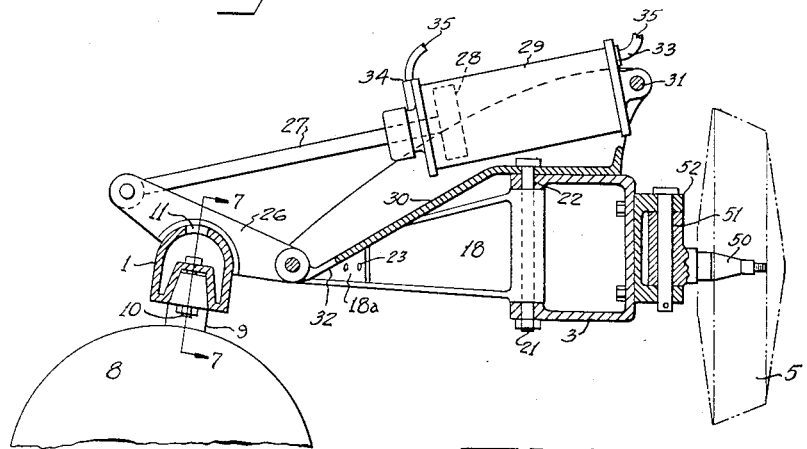
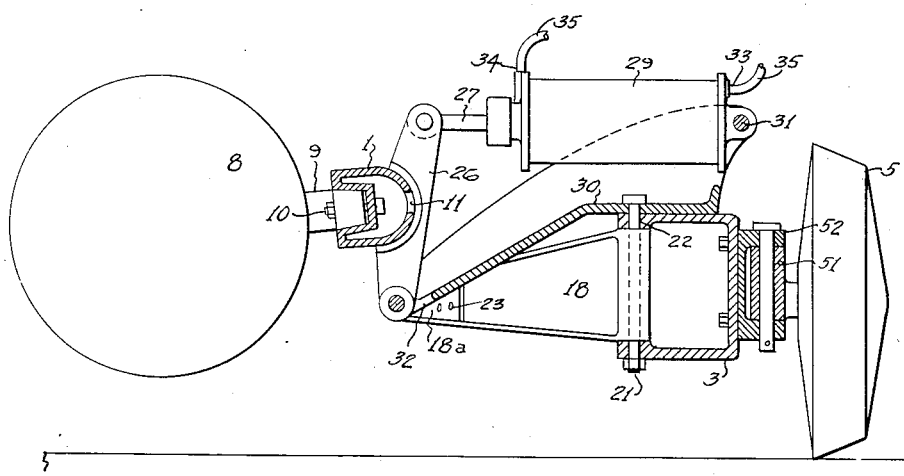
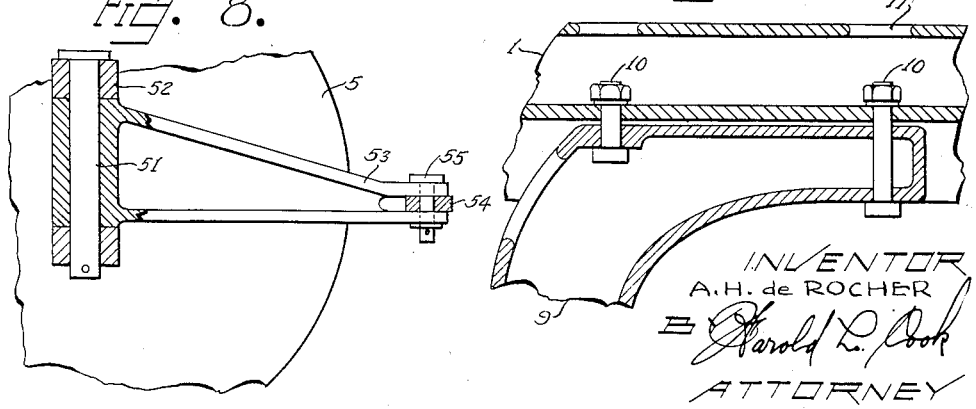
INVENTOR
A. H. de ROCHER
BY Harold L. Cook
ATTORNEY Patented Apr. 5, 1938

2,113,556

UNITED STATES PATENT OFFICE 2,113,556

DISK PLOW

Arthur H. de Rocher, Honolulu, Territory of Hawaii, assignor to Electric Steel Foundry, Portland, Oreg., a corporation of Oregon Application March 14, 1936, Serial No. 68,851

11 Claims. (Cl. 97—53)

This invention relates to agricultural implements, and has particular reference to disk gang plows.

The subject matter of the invention pertains to improvements in gang plows and the like which are particularly suitable for use under varying soil conditions as, for example, a succession of hard, wet and loose soils; and also for use in soils composed of gumbo clay, which necessitate a very different type of equipment than do ordinary farm soils. It will be appreciated that the operation of a plow differs under differing soil conditions, and the usual tendency of plows to creep or dig in, etc., is compensated, in an implement embodying the present invention, by adjustments provided for regulating the respective positions of the plow disks and wheels, as well as the angular alignment of the disks, and the width and depth of the furrows.

It is an object of the invention to provide an apparatus of the character described which readily may be adjusted to achieve satisfactory results when operated in a succession of differing types of soil, the several parts being adjustable during continuous operation of the plow.

It is a further object of the invention to provide an apparatus for elevating the plow disks of a gang plow during the plowing operation, and for maintaining them at any intermediate setting.

A further object of the invention is to provide means to permit lateral adjustment of the plow beam with relation to the longitudinal axis of the implement to determine the width of furrows turned by a gang of disk plows.

With these and other advantages and objects in view, the invention resides in the novel construction and combination of parts hereinafter described, illustrated in the accompanying drawings, and set forth in the appended claims; it being understood that various changes in form, proportion, size and details of construction within the scope of the claims may be resorted to without departing from the spirit or sacrificing any of the advantages of the invention.

In the drawings:

Figure 1 is a top plan view of a disk gang plow embodying the principles of my invention.

Figure 2 is a rear end elevation, partly in section, illustrating the transverse adjustment of the rear end of the plow beam, the relative positions of land and furrow wheels, as well as the lowermost position of the disks.

Figure 3 is a sectional view taken from 3 to 3 in Figure 1 along the draft cable.

Figure 4 is a sectional view taken on the line 4—4 of Figure 3.

Figure 5 is a sectional view taken on the line 5—5 of Figure 1 illustrating the means for rotating the plow beam and showing the disks in lowermost position.

Figure 6 is a sectional view similar to Figure 5 but showing the disks in raised position.

Figure 7 is a sectional view taken on the line 7—7 of Figure 5.

Figure 8 is a sectional elevation taken on the line 8—8 of Figure 1.

The illustrated embodiment of the invention comprises a plow beam 1, pivotally supported upon transverse axles 2 and 3, which are in turn carried by land wheels 4 and 5 and furrow wheels 6 and 7, the whole of which is intended to be propelled by a tractor or other motor driven means (not shown). Cultivating tools 8, such as furrowing disks, are secured to disk standards 9 removably secured to the under side of the plow beam 1 at spaced intervals. The upper extremities of the disk standards are adapted to engage recesses in the under side of the plow beam 1, and are secured therein as by bolts 10. Openings 11 in the top of the beam 1 permit access to the bolt heads. The disks 8 have the usual means of angular adjustment (not shown) relative to the disk standards.

The plow beam 1 is offset adjacent its end portions as at 1a in the manner of a crank, and the ends thereof are rotatably journaled in journal boxes 12, one of which is adjustably secured to each of the transverse axles 2 and 3. Longitudinal openings 13 in the side walls of the axle frames permit lateral positioning of either or both of the journal boxes 12 to permit angular adjustment of the plow beam with relation to the axles; the adjustment being made by removing the bolts 14 which secure the journal boxes 12 to the axle frames and replacing them through holes 15 corresponding with the desired position of the journal box. A filler plate 16 is interposed between the journal box and the axle frame for the obvious purpose of lending rigidity to the construction, these filler plates being punched or drilled for the reception of the bolts 14.

The angularity of the plow beam 1 with respect to the front and rear axles of the plow is maintained by means of axle braces 17 and 18. The rear axle brace 17 is secured to the axle 2 by a pin 19 passing through perforations in the end of the axle brace and a flanged portion of the axle. The brace is formed with an adjustable extension arm 17a secured in the sleeve portion of the axle brace by set screws 20, and is hingedly secured to the plow beam 1 on the center line of the end bearings thereof. The axle brace 18 is connected to the front axle by means of a pin 21 passing through an opening in the end of the brace and through a slot 22 in the front axle, and also is formed with an extension arm 18a adjustably secured in the sleeve portion of the brace by set screws 23. The extension arm 18a is hingedly secured to a projection of the plow beam 1, the pivot point or hinge 24 being in line with the longitudinal axis of the end bearings of the beam 1 in a manner similar to the hinge for the rear axle brace 17. This construction permits rotation of the plow beam 1 about an axis on the center line of its end bearings without affecting the efficacy of the axle braces.

The plow beam 1 is provided with an arm 26 projected at right angles to its longitudinal axis and parallel with its transverse axis. Pivotally connected to one end of the arm 26 is a piston rod 27 carrying a piston 28 which operates within a cylinder 29. The cylinder 29 is carried by a bracket plate 30 which is preferably mounted upon one end of the front axle 3, the cylinder being pivoted upon its bearing 31. This will compensate for the movement of the arm 26 as the plow beam 1 is rotated. The bracket plate 30 is formed with an extension 32 upon which the opposite end of the arm 26 is pivoted, and which acts as a fulcrum for the piston rod 27, the pivotal point of the arm 26 upon the bracket extension 32 being in line with the longitudinal axis of the plow beam 1.

The cylinder 29 is equipped with hose connections 33 and 34, from each of which a flexible hose 35 leads to a reservoir tank for the piston actuating medium (usually oil), preferably mounted upon the tractor. As oil is admitted to the rear end of the cylinder 29 through the hose connection 33, the oil in the cylinder will be exhausted therefrom through the hose connection 34 at the forward end of the cylinder, and the piston 28 will be forced forwardly to move the piston rod 27 into extended position to swing the transversely projecting arm 26 of the beam 1 downwardly into horizontal position, as illustrated in Figure 5. As this movement takes place, the plow beam 1 is rotated upon the longitudinal axis of its end bearings to cause the furrowing disks to swing down into operative engagement with the ground. To elevate the plow disks out of engagement with the ground, oil is admitted to the forward end of the cylinder 29 through the hose connection 34, the oil in the rear end of the cylinder being exhausted through the hose connection 33. By this means the piston 28 is forced toward the rear of the cylinder 29 to retract the piston rod 27 and swing the arm 26 into perpendicular position, as illustrated in Figure 6. As this movement takes place, the plow beam 1 is rotated upon its longitudinal axis in reverse direction to swing the plow disks out of engagement with the ground.

It will be appreciated that the actuating medium is admitted to and exhausted from the cylinder 29 at the will of the operator by means of valves (not shown), which may be located in juxtaposition to the cylinder 29, or to the reservoir on the tractor, as may be desired. In ordinary practice, however, an operator's seat is provided on the implement adjacent the cylinder 29, and the control valves are placed so as to be accessible therefrom.

By manipulation of the valves which control the piston actuating means, pressure may be applied simultaneously to each end of the cylinder 29 to cause the piston 28 to move a predetermined distance toward either end of the cylinder. In this manner the operator may cause the plow disks to be elevated over obstructions such as rock or other obstacles which may be in the path of movement of the plow. By the same means, the operator may regulate the depth to which the plow disks will penetrate the soil, this being determined by the degree of inclination of the arm 26 under control of the piston 28 and piston rod 27.

The rear land wheel 4 is mounted upon an axle 36 having a pintle 37 which extends vertically through bearings 38 formed on the adjacent end of the rear axle 2. A tongue 39 is formed integral with said pintle 37 and extends forwardly into registry with a webbed portion 40 of the rear axle brace 17. A series of holes 41 in the webbed portion 40 of the rear axle brace 17 are aligned with the respective positions of a corresponding hole in the end of the tongue 39, and by means of a pin or bolt placed therethrough, the wheel may be set to travel at any predetermined angle of direction with respect to the axle 2 or the longitudinal axis of the plow beam 1.

The direction of travel of the rear furrow wheel 6 is also adjustable with respect to the axle 2 and the associated plow beam 1. The wheel 6 is mounted upon an axle 42 having a pintle 43 which extends vertically through bearings 44 formed integral with the axle 2. A plate 45 is so secured to the pintle 43 as to turn therewith, said plate 45 having a perforated arm 46 extending over the end of the axle 2, the perforation in the end of the arm 46 being in registry with a series of perforations 48 in the top plate of the axle 2. A pin or bolt 49 may be placed through the end of the arm 46 to extend through one of said perforations 48 to maintain the wheel 6 at the desired angle to the axle frame 2.

The construction described permits manual adjustment of the rear wheels to determine their direction of travel, whereby the rear of the implement may be offset from the front end in such manner that the plow beam 1 extends diagonally from the front axle 3, thus affording additional means to control the width of the furrows.

The front land wheel 5 is mounted upon an axle 50 having a pintle 51 extending through vertically aligned bearings 52 formed integral with the end of the front axle 3. A clevised tongue 53 is formed integral with the pintle 51 and is adapted to adjustably engage one end of a guide bar 54 by means of a pin or bolt 55. The front furrow wheel 7 is likewise mounted upon an axle having a pintle 56, secured to which is a plate 57 in the same manner as has been described in connection with the rear furrow wheel 6. A second clevised tongue 58 is formed as an integral part of the plate 57, and also engages one end of the guide bar 54 as by a pin 59. The guide bar 54 is perforated at each end with a series of spaced holes for the reception, respectively, of the pins 55 and 59 by which to adjust the alignment of the front wheels 5 and 7. The direction of travel of the front wheels is thus controlled by the guide bar 54 in a manner presently to be described.

The implement is adapted to be pulled by a tractor or other motor driven means by means of a draft cable 60, one end of which is secured to the plow beam 1 by means of a hitch block 61, as illustrated in Figures 1 and 3. The cable 60 is trained through an eye bolt 62 secured to the underside of the front axle 3, and through a second eye bolt 63 secured to the guide bar 54. It will be noted that the position of the eye bolt 63 is adjustable along the guide bar 54, a series of spaced holes 64 being provided in said bar to receive the bolt securing means. It being apparent that the weight of the implement will keep the draft cable 60 taut, so that it will assume a straight line between the tractor and the front axle 3, it will also appear that the cable 60 will serve to steer the implement by reason of its being trained through the eye bolt 63 secured to the guide bar 54. The position of the eye bolt 63 may be so adjusted longitudinally of the guide bar 54 to cause the implement to travel in a path to one side of the path of the tractor, whereby the tractor may be driven over firm ground and the implement be caused to follow the line of demarcation between firm and plowed ground.

*Operation*

In operation, the implement is pulled by a tractor or the like by means of a cable 60 secured to a hitch block 61 positioned on the plow beam 1 intermediate the front and rear axles. The cable is trained through an eye bolt 62 secured to the front axle frame, and through an eye bolt 63 secured to the guide bar 54. The implement is steered by the guide bar 54, the direction of travel being predetermined by adjusting the position of the eye bolt 63 longitudinally of the guide bar 54. By this means, the furrow wheel 7 may be caused to follow the line of demarcation between firm and plowed ground, whereas the path of the tractor may be entirely on firm ground.

The rear wheels 4 and 6 are secured to the axle 2 by means of pintles extending through vertically aligned bearings in such manner that the direction of travel of each of these wheels is subject to manual adjustment. For example, these wheels may be so adjusted that the furrow wheel 6 will be caused to follow the furrow newly turned by the rearmost disk 8, the plow beam 1 extending diagonally across the furrows.

The plow beam 1 is offset at each end in the manner of a crank, the ends thereof being rotatably journaled in bearings mounted upon the front and rear axles, respectively. Both front and rear axles of the implement are braced to the plow beam 1, each axle brace being secured to the plow beam by means of a hinge which is articulated in line with the longitudinal axis of the plow beam so as to permit rotation of the latter without destroying the efficacy of the axle brace. In this connection, it may be stated that each of the axle braces 17 and 18 may form an integral part of the respective axles, instead of being pivoted thereto by means of pins or bolts as herein illustrated and described. Each such combined axle and brace would necessarily employ trunnion bearings wherein to pivot the offset end portions of the plow beam 1, the said bearings being axially aligned to permit rotation of the plow beam 1 about the longitudinal axis of its end portions.

The plow beam 1 is rotated at the will of the operator by actuation of the piston 28 within the cylinder 29, oil or other actuating means being admitted thereto by means of manually controlled valves in juxtaposition thereto. Rotation of the plow beam 1 results in raising or lowering the plow disks 8, according to the manner in which the piston 28 is actuated within the cylinder 29. Accordingly, the plow disks 8 may be forced to their lowermost position and caused to penetrate the soil to the maximum permissible depth; or may be elevated entirely out of contact with the ground; or may be maintained at any intermediate setting, depending upon the character of the soil to be worked.

Although the invention has been illustrated and described herein as being particularly adaptable to disk gang plows, it may also be used in connection with other types of implements for cultivating the soil, and, as will be understood, various changes and modifications may be made in the physical embodiment of the invention without departing from the spirit or scope of the invention.

Having now described my invention and in what manner the same may be used, what I claim as new and desire to protect by Letters Patent is:

1. An agricultural implement, comprising a pair of spaced axles, a plow supporting beam having offset end portions mounting said axles, an axle brace engaging said beam intermediate said end portions and being articulated on the center line of said end portions, and means for rotating said beam about the longitudinal axis of its said ends.

2. An agricultural implement, comprising a pair of spaced axles, a plow supporting beam having offset end portions rotatably mounting said axles, axle braces engaging said beam intermediate said end portions, said axle braces being articulated on the center line of said beam ends to permit rotation of said beam about the longitudinal axis of said end portions.

3. An agricultural implement, comprising a pair of spaced axles, a plow supporting beam having end portions rotatably mounting said axles, draft means for pulling said implement, said draft means being secured to said beam intermediate said axles.

4. An agricultural implement, comprising a pair of spaced axles, a plow supporting beam mounting said axles, a guide bar for governing the direction of travel of said implement, draft means for pulling said implement, said draft means being secured to said beam intermediate said axles and positioned therefrom to control said guide bar.

5. An implement of the character described, comprising a pair of spaced axles, a plow supporting beam having longitudinally aligned offset end portions rotatably mounting said axles, and means for rotating said beam about the longitudinal axis of said end portions.

6. An implement of the character described, comprising a pair of spaced axles, a gang of disks, a supporting beam for said disks having offset end portions rotatably mounting said axles, and means for rotating said beam about the longitudinal axis of said end portions, said means comprising a piston and cylinder means operable to rotate said beam to elevate said disks from their working position and maintain them at a predetermined elevation.

7. An implement of the character described, comprising a pair of spaced axles, a bearing mounting each axle, and a plow supporting beam having end portions rotatively journalled in said bearings, one of said bearings being movable longitudinally of the axle to permit angular adjustment of the plow beam relative to said axles.

8. An implement of the character described, comprising a pair of spaced axles, a plow supporting beam having offset end portions mounting said axles, a brace for bracing the plow beam to one of said axles, said brace being articulated on the center line of the end portions of the plow beam, and means for rotating said plow beam about the longitudinal axis of its said ends.

9. An implement of the character described, comprising a pair of spaced axles, a plow supporting beam having offset end portions rotatably mounting said axles, said end portions having a common axis, and means for rotating said beam about the longitudinal axis of said end portions.

10. An implement of the character described, comprising a pair of spaced axles, a plow supporting beam having offset end portions rotatably mounting said axles, said end portions being parallel to the longitudinal axis of said beam, and means for rotating said beam about the longitudinal axis of said end portions.

11. An implement of the character described, comprising a pair of spaced axles, a cultivating tool, a supporting beam for said tool having offset end portions rotatably mounted on said axles, said end portions having a common longitudinal axis, and a piston and cylinder means operable to rotate said beam about the longitudinal axis of said end portions to elevate said tool from its lowermost position and maintain it at any intermediate position.

ARTHUR H. DE ROCHER.